March 7, 1944.  O. J. BLOMBERG ET AL  2,343,394
BRAKE SIGNAL
Filed March 8, 1941  2 Sheets-Sheet 2

Inventors:
Otto J. Blomberg
Henning A. Eklind
By Albert J. Fihe
Attorney

March 7, 1944.  O. J. BLOMBERG ET AL  2,343,394
BRAKE SIGNAL
Filed March 8, 1941   2 Sheets-Sheet 1
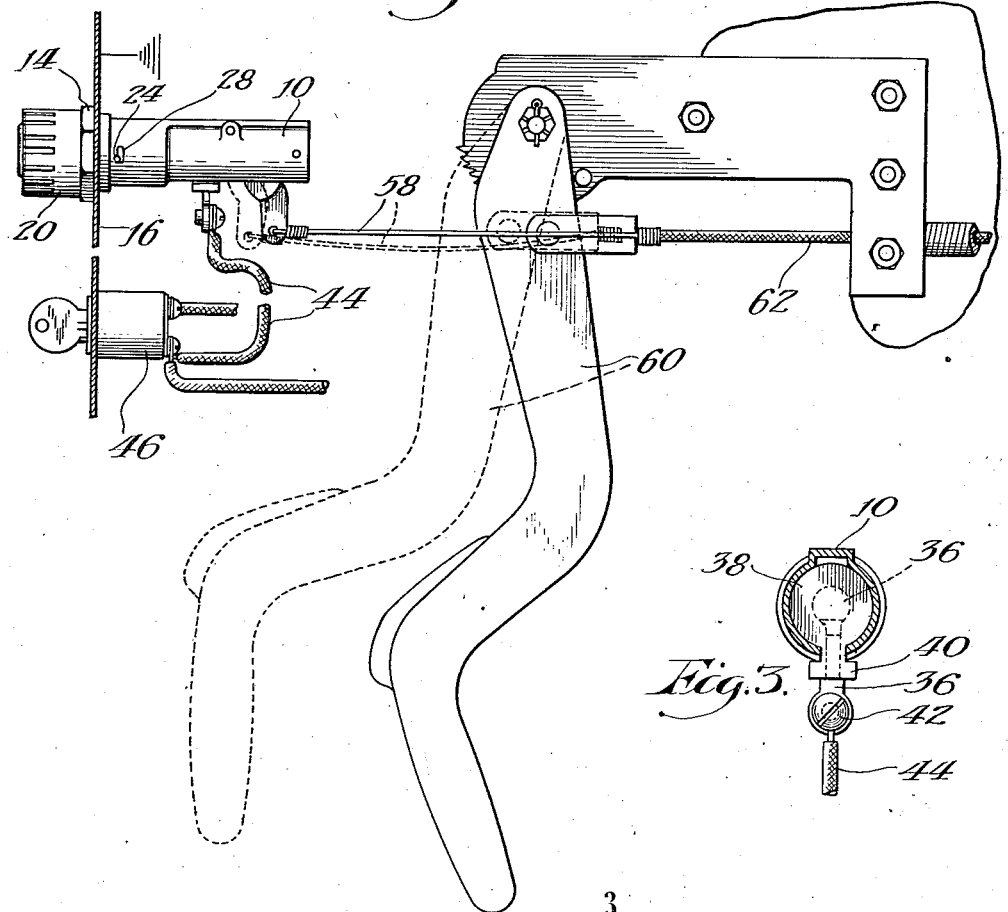
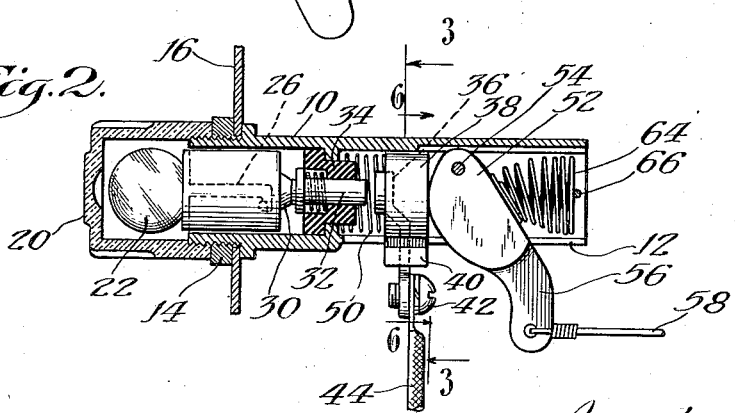
Inventors:
Otto J. Blomberg
Henning A. Eklind
by Albert Fike
Attorney Patented Mar. 7, 1944

2,343,394

UNITED STATES PATENT OFFICE 2,343,394

BRAKE SIGNAL

Otto J. Blomberg and Henning A. Eklind,
Chicago, Ill.

Application March 8, 1941, Serial No. 382,404

4 Claims. (Cl. 177—311)

This invention relates to an improved brake signal for automobiles and has, for one of its principal objects, means for automatically indicating to the driver of a car the status of the hand brake sometimes known as the emergency brake.

One of the principal objects of the invention is to provide a means whereby the driver will be prevented from driving the car without first releasing the hand brake so that there will be no more burned out emergency brakes or scored brake drums.

Another object of the invention is the provision of a one-unit brake warning signal combination guard and protector for the parking brake whereby the car will not be driven with dragging hand brake and whereby damage such as burned out brakes, oil seals and the like will be automatically prevented.

Another and further important object of the invention is the provision of a brake protector for automobiles wherein the operator of the car will be automatically notified as to whether or not the hand brake is set as soon as he turns on the ignition switch preparatory to starting the car. The signal will operate as long as the ignition switch is in closed circuit connection.

Other and further important objects of the invention will be apparent from the disclosures in the accompanying drawings and following specification.

The invention, in a preferred form, is shown in the drawings and hereinafter more fully described.

In the drawings:

Figure 1 is a side elevation of the improved automobile hand brake protector of this invention, showing the same installed and with the respective connections to other parts of the car and illustrating the operation in dotted lines.

Figure 2 is a detail view, partly in section, showing the interior construction of the brake protector element of this invention, certain parts being illustrated in dotted lines.

Figure 3 is a sectional view taken on the line 3—3 of Figure 2, looking in the direction indicated by the arrows.

As shown in the drawings:

Figure 5:
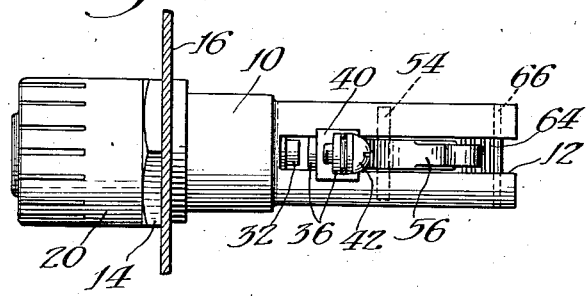
Figure 5 is a bottom view of the brake protector element of this invention.
Figure 6:
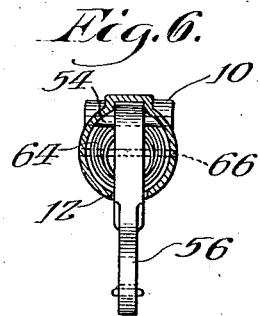
Figure 6 is a detail view, partly in section, taken on the lines 6—6 of Figure 2 and looking in the direction indicated by the arrows.

The reference numeral 10 indicates generally the body or container of the improved brake protector of this invention, this being substantially in the form of a cylinder open at both ends and having a cut-away slot 12 extending along its bottom for about two-thirds of the length of the device (Figure 5).

Figure 4:
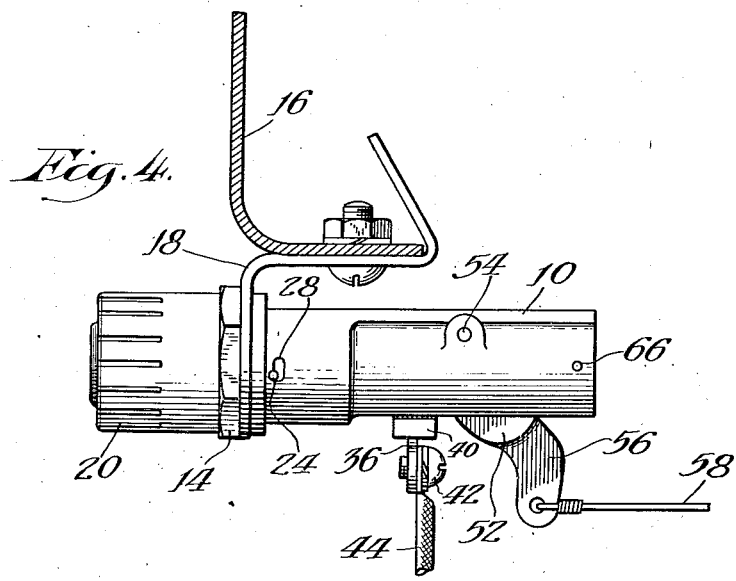
Figure 4 is an enlarged side elevation of the hand brake protector element of this invention showing a slightly modified means of attaching the same in desired position in an automobile.

This cylinder is screw-threaded at its forward end, and a lock nut 14 is mounted on this screw-threaded portion so that the complete device may be readily mounted on some support as, for example, the instrument panel 16 of an automobile as shown in Figure 1 or a bracket 18 which, in turn, can be affixed to the instrument panel 16 as illustrated in Figure 4.

Also adapted to be screw-threadedly mounted on the forward portion of the cylinder 10 is a transparent closure element 20 preferably red in color and composed of some suitable material such as a synthetic resin or the like and which houses the light bulb 22. This transparent element 20 may have some insignia thereon or incorporated into the face thereof such as a warning notice reading "Brake on" or "Hand brake set" and may also include some trade-mark or the name of the manufacturer.

The light bulb 22 is of the ordinary type and is held in position by the usual pins 24 which fit into bayonet slots 26 terminating in openings 28 in the casing 10.

The current-carrying projection 30 at the rear end of the bulb 22 is adapted to contact a metal pin or the like 32 mounted in an insulating block 34 suitably positioned in the casing 10.

Figure 7:
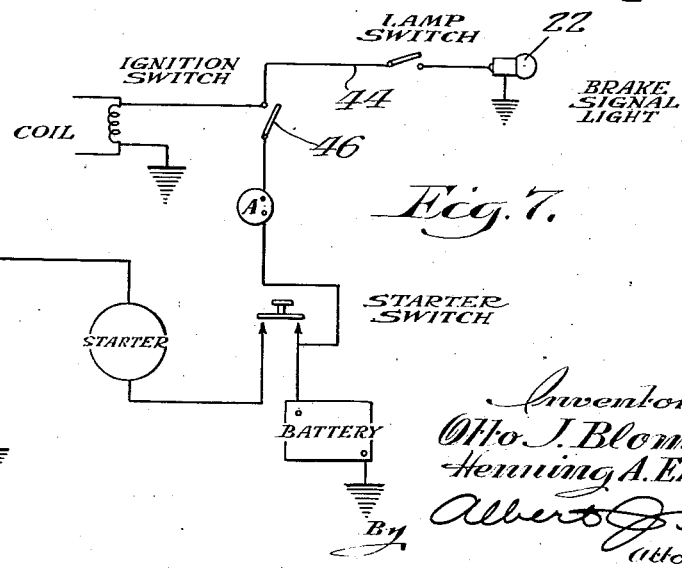
Figure 7 is a diagrammatic view, illustrating the electrical connections and installation of the improved brake signal of this invention.

The rear end of the pin 32 projects slightly beyond the block of insulation 34 and in juxtaposition with a current-carrying element 36 mounted in another block of insulation 38 which is slidably positioned in the rear end of the cylinder 10 and has an extension 40 which fits through the slot 12 and projects therebelow (Figures 2 and 3). The metal element 36 passes downwardly through the extension 40 and terminates in a binding post or the like 42 to which a current-carrying wire 44 is connected. This wire is connected to the battery of the car by the ignition switch 46 (Figures 1 and 7). A helical spring 50 normally holds the contact elements 32 and 36 away from each other as illustrated in Figure 2.

Mounted behind the slidable block of insulation 38 and in a light contact therewith is a cam element 52 shaped as best shown in Figure 2 and pivoted on a pin 54 mounted in the upper portion of the casing 10. The lower end of this cam element has an extension 56 which projects below the casing in a position so as to be movable in the slot 12, and this extension is connected by means of a wire 58 to the upper portion of the lever or operating handle 60 of the usual emergency or hand brake of the modern automobile. A cable 62 leads from the emergency brake lever to the brakes of the car.

Positioned behind the cam 52 is a coil spring 64, this being wholly inside the casing 10 and maintained in position by means of a pin 66.

The operation of the device will be obvious; namely, when the hand brake lever 60 is pulled into car braking position such as shown by the dotted lines in Figure 1, the wire or cable 58 will be slackened, thereby enabling the spring 64 to force the cam element 52 forwardly against the insulating block 38 which will, accordingly, be moved forwardly in the casing 10, carrying the wire 44 with it and moving against the tension of the spring 50, will allow the current-carrying elements 32 and 36 to come into contact.

As soon as the ignition switch 46 of the automobile is turned into "on" position, the signal lamp 22 will be immediately lighted by current flowing therethrough, and the fact that the brake is in "on" position will be immediately apparent to the operator or driver of the car.

As soon as the hand brake 60 is released, tension will be applied to the wire or cable 58, the cam 52—56 will be moved rearwardly, and the spring 50 will separate the contacts 32 and 36, shutting off the current from the signal light 22.

It will be evident that herein is provided a brake protector which will save a great deal of trouble, will keep the brake system in good and safe condition, thereby contributing to safer driving and will, undoubtedly, avoid undesirable wearing of the emergency brake lining. It will also add to the efficiency of the engine of the automobile.

The installation is simple and can be made by almost anyone including proper adjustments, and the operation is entirely automatic, consuming practically no current and not interfering in any way with the ignition circuit or with installations or operation of radios, air conditioning units or the like.

Obviously, some other signal means may be used instead of the light bulb 22 such as a sound producing element which may also be electrically operated or some other visual means may be employed which need not be electrically operated. It will additionally be evident that the casing 10 can be mounted in the car at various points so long as the proper connection to the brake handle 60 is available, and the lock nut 14 allows of the rotation of the casing 10 into various positions, depending upon the accessibility of the brake handle 60 and the manner in which the connecting cable 58 is applied to the elements with which it cooperates.

We are aware that many changes may be made and numerous details of construction varied throughout a wide range without departing from the principles of this invention, and we, therefore, do not propose limiting the patent granted hereon otherwise than as necessitated by the prior art.

We claim as our invention:

1. A brake signal for automobiles comprising a casing, means for mounting the casing on the instrument panel of the vehicle, a signal means in the casing, means for electrically operating the signal, and means connected to the hand brake of the automobile for completing the electrical circuit when the brake is in "on" position, said means comprising an insulating block fixed in the casing, a current-carrying pin in the block, another insulating block movably mounted in the casing, and a current-carrying element in said block, means for attaching a current-carrying wire to the movable block, and means for shifting the position of the movable block upon application and release of the automobile brake, and an electrical connection between the signal means and the switch of the ignition system of the automobile whereby the signaling device will operate only when the switch is in "on" position.

2. A brake signal for automobiles comprising a casing, means for mounting the casing on the instrument panel of the vehicle, a signal means in the casing, means for electrically operating the signal, and means connected to the hand brake of the automobile for completing the electrical circuit when the brake is in "on" position, said means comprising an insulating block fixed in the casing, a current-carrying pin in the block, another insulating block movably mounted in the casing, and a current-carrying element in said block, means for attaching a current-carrying wire to the movable block, and means for shifting the position of the movable block upon application and release of the automobile brake, said means including a cam pivotally mounted in the casing, and a connection between the cam and the brake lever of the automobile, and an electrical connection between the signal means and the switch of the ignition system of the automobile whereby the signaling device will operate only when the switch is in "on" position.

3. A brake signal for automobiles comprising a casing, means for mounting the casing on the instrument panel of the vehicle, a signal means in the casing, means for electrically operating the signal, and means connected to the hand brake of the automobile for completing the electrical circuit when the brake is in "on" position, said means comprising an insulating block fixed in the casing, a current-carrying pin in the block, another insulating block movably mounted in the casing, and a current-carrying element in said block, means for attaching a current-carrying wire to the movable block, and means for shifting the position of the movable block upon application and release of the automobile brake, said means including a cam pivotally mounted in the casing, and a connection between the cam and the brake lever of the automobile, said connection comprising a cable adapted to be tensioned when the brake is in "off" position and slackened when the brake is in "on" position, and spring means for moving the cam forwardly in the casing when tension on the cable is slackened, said cam operating against the rear face of the movable insulating block, and an electrical connection between the signal means and the switch of the ignition system of the automobile whereby the signaling device will operate only when the switch is in "on" position.

4. An automatic hand brake signal for automobiles comprising a cylindrical casing, means for mounting the casing on the instrument panel of the vehicle, a signal light in the forward part of the casing, means for mounting the light in the casing, said means comprising grooves on the inner face of the casing, bayonet slots at the inner ends of the grooves, said bayonet slots opening into the outer face of the casing, and means for supplying current to the light when the brake is in "on" position, said means including an insulating block fixed in the casing, a metal pin fixed in the insulating block, a further insulating block shiftably positioned in the casing, said last-named block having a projection extending through a slot longitudinally of the casing, a current-carrying means fitted into said movable block and extending through and beyond the extension thereof, a current-carrying wire adapted to be fixed at the extremity of said current carrying element, and spring and cam means for shifting said movable insulating block to and fro in the casing upon the application and release of the hand brake of the automobile, and an electrical connection between the signal means and the switch of the ignition system of the automobile whereby the signaling device will operate only when the switch is in "on" position.

OTTO J. BLOMBERG.
HENNING A. EKLIND.